United States Patent
Wang

(10) Patent No.: US 12,183,248 B2
(45) Date of Patent: Dec. 31, 2024

(54) SPLICING DISPLAY, DRIVING METHOD, AND SPLICING DISPLAY DEVICE

(71) Applicant: TCL CHINA STAR OPTOELECTRONICS TECHNOLOGY CO., LTD., Guangdong (CN)

(72) Inventor: Qian Wang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/597,946

(22) PCT Filed: Jan. 14, 2022

(86) PCT No.: PCT/CN2022/072119
§ 371 (c)(1),
(2) Date: Jul. 13, 2023

(87) PCT Pub. No.: WO2023/130496
PCT Pub. Date: Jul. 13, 2023

(65) Prior Publication Data
US 2024/0038125 A1 Feb. 1, 2024

(30) Foreign Application Priority Data
Jan. 5, 2022 (CN) .......................... 202210006623.4

(51) Int. Cl.
*G09G 3/20* (2006.01)
(52) U.S. Cl.
CPC ..... *G09G 3/2074* (2013.01); *G09G 2300/026* (2013.01)

(58) Field of Classification Search
CPC .. G09G 2300/026; G09G 3/2074; G09G 3/20; G02F 1/13336; G09F 9/3026
See application file for complete search history.

(56) References Cited

U.S. PATENT DOCUMENTS 6,680,761 B1 * 1/2004 Greene ............... G02F 1/13336
349/73
2008/0225143 A1 9/2008 Joffer et al.
(Continued)

FOREIGN PATENT DOCUMENTS

CN 101493609 A 7/2009
CN 102981794 A 3/2013
(Continued)

OTHER PUBLICATIONS

International Search Report in International application No. PCT/CN2022/072119, mailed on Oct. 8, 2022.
(Continued)

*Primary Examiner* — Ricardo Osorio
(74) *Attorney, Agent, or Firm* — PV IP PC; Wei Te Chung

(57) ABSTRACT

The present application provides a splicing display, a driving method, and a splicing display device. The splicing display includes first sub-display panels and second sub-display panels. A size and a number of the first sub-display panels are respectively same as a size and a number of the second sub-display panels in horizontal or vertical directions. The first sub-display panel and the second sub-display panel are misaligned by N rows/columns of sub-pixels in the horizontal or vertical directions. Misaligning N rows/columns of the sub-pixels can increase an accuracy of the splicing display, and splicing positions can be prevented from problems of misalignment and blurring.

18 Claims, 3 Drawing Sheets

(56) References Cited

U.S. PATENT DOCUMENTS

2014/0307430 A1* 10/2014 Lo .............................. G09F 9/30
                                                            362/231
2019/0362667 A1* 11/2019 Ma ..................... G06V 40/1318

FOREIGN PATENT DOCUMENTS

| CN | 103440822 | A |   | 12/2013 |   |            |
|----|-----------|---|---|---------|---|------------|
| CN | 103543548 | A |   | 1/2014  |   |            |
| CN | 104157216 | A |   | 11/2014 |   |            |
| CN | 108806517 | A |   | 11/2018 |   |            |
| CN | 109036248 | A |   | 12/2018 |   |            |
| CN | 110718179 | A | * | 1/2020  |   |            |
| CN | 112992095 | A |   | 6/2021  |   |            |
| CN | 116469317 | A | * | 7/2023  |   |            |
| JP | 2016102934| A |   | 6/2016  |   |            |
| WO | WO-0154106| A2| * | 7/2001  | ......... | G02F 1/13336 |
| WO | 2019220527| A1|   | 11/2019 |   |            |

OTHER PUBLICATIONS

Written Opinion of the International Search Authority in International application No. PCT/CN2022/072119,mailed on Oct. 8, 2022.
Chinese Office Action issued in corresponding Chinese Patent Application No. 202210006623.4 dated Aug. 30, 2022, pp. 1-9.
Japanese Office Action issued in corresponding Japanese Patent Application No. 特願2022-505264 dated Apr. 9, 2024, pp. 1-5.

* cited by examiner

SPLICING DISPLAY, DRIVING METHOD, AND SPLICING DISPLAY DEVICE

FIELD OF INVENTION

The present application is related to the field of display technology and specifically to a splicing display, a driving method, and a splicing display device.

BACKGROUND OF INVENTION

In recent years, splicing displays have been widely used. The splicing displays usually include a plurality of display panels, and different display panels display different images, and a completed image can be formed by splicing the images displayed by the display panels.

Since a splicing display is composed of a plurality of different display panels, and each of the display panels displays different images, edge portions of each of the display panels, especially portions of the images connecting to other display panels, will be blurred, misaligned, etc., thereby affecting a display of the images.

SUMMARY OF INVENTION

The present application provides a splicing display, a driving method, and a splicing display device, aiming at solving problems of blurred and dislocated images at splicing positions of the splicing display in prior art.

In a first aspect, the present application provides a splicing display. The splicing display includes at least two sub-display panels.

The at least two sub-display panels include at least one first sub-display panel and at least one second sub-display panel. A size and a number of the first sub-display panels are respectively same as a size and a number of the second sub-display panels in a first direction. The first sub-display panel and the second sub-display panel are spliced in the first direction with a misaligned manner. The first sub-display panel and the second sub-display panel are misaligned by N rows/columns of sub-pixels.

The first sub-display panel includes a first dynamic display region and a first normally black display region. The second sub-display panel includes a second dynamic display region and a second normally black display region. The sub-pixels in the first dynamic display region and the second dynamic display region one-to-one correspond to each other and their number of rows/columns are same. The first normally black display region includes a first normally black sub-display region without correspondence. The second normally black display region includes a third normally black sub-display region without correspondence.

The first normally black sub-display region includes N rows/columns of the sub-pixels. The third normally black sub-display region includes N rows/columns of the sub-pixels. N is a positive integer.

The splicing display provided by the present application includes at least two sub-display panels. The at least two sub-display panels include at least one first sub-display panel and at least one second sub-display panel. The size and the number of the first sub-display panels are respectively same as the size and the number of the second sub-display panels in horizontal or vertical directions. The first sub-display panel and the second sub-display panel are misaligned by N rows/columns of the sub-pixels in the horizontal or vertical directions. In this arrangement of the splicing display, misaligning N rows/columns of the sub-pixels can effectively increase an accuracy of the splicing display, and splicing positions can be prevented from problems of misalignment and blurring.

In a possible embodiment, the first normally black display region further includes a second normally black sub-display region. The second normally black sub-display region and the first normally black sub-display region are respectively connected to two sides of the first dynamic display region.

The second normally black display region further includes a fourth normally black sub-display region. The fourth normally black sub-display region is connected between the second dynamic display region and the third normally black sub-display region. Numbers of rows of the sub-pixels of the fourth normally black sub-display region and the second normally black sub-display region are same, or numbers of columns of the sub-pixels of the fourth normally black sub-display region and the second normally black sub-display region are same.

In this embodiment, the first normally black display region includes the second normally black sub-display region, and the second normally black sub-display region includes the fourth normally black sub-display region.

In a possible embodiment, a number of rows or a number of columns of the sub-pixels of the first dynamic display region and the second dynamic display region is a multiple of three or four.

In this embodiment, one complete pixel of a sub-display panel normally includes three sub-pixels or four sub-pixels. Since the number of rows or the number of columns of the sub-pixels of the dynamic display region that can normally display images is a multiple of three or four, the complete pixels can be formed to display images.

In a possible embodiment, a sum of numbers of rows of the sub-pixels or a sum of numbers of columns of the sub-pixels of the fourth normally black sub-display region and the third normally black sub-display region is a multiple of three or four.

In this embodiment, the number of rows of the number of columns of the sub-pixels of the second normally black display region is usually a multiple of three or four.

In a possible embodiment, a number of rows or a number of columns of the sub-pixels of the first normally black sub-display region is same as a number of rows or a number of columns of the sub-pixels of the third normally black sub-display region.

In this embodiment, there are no sub-pixels corresponding to the first normally black sub-display region in the first sub-display panel, and there are no sub-pixels corresponding to the third normally black sub-display region in the second sub-display panel. The above two situations are caused by misaligning the sub-display panels, so the numbers of rows or the numbers of columns of the sub-pixels of the first normally black sub-display region and the third normally black sub-display region are same.

In a possible embodiment, three sub-pixels constitute one pixel. When N=3a−2, the second normally black sub-display region includes two rows/columns of the sub-pixels. When N=3a−1, the second normally black sub-display region includes one row/column of the sub-pixels. When N=3a, the second normally black sub-display region includes zero rows/columns of the sub-pixels. a is a positive integer.

In this embodiment, the numbers of the sub-pixels of the first normally black sub-display region and the second normally black sub-display region are determined.

In a possible embodiment, four sub-pixels constitute one pixel. When N=4a−3, the second normally black sub-display region includes three rows/columns of the sub-pixels. When N=4a−2, the second normally black sub-display region includes two rows/columns of the sub-pixels. When N=4a−1, the second normally black sub-display region includes one row/column of the sub-pixels. When N=4a, the second normally black sub-display region includes zero rows/columns of the sub-pixels. a is a positive integer.

In this embodiment, the numbers of the sub-pixels of the second normally black sub-display region and the fourth normally black sub-display region are determined.

In a possible embodiment, the first sub-display panel and the second sub-display panel are same.

In this embodiment, the first sub-display panel and the second sub-display panel are same.

In a possible embodiment, the splicing display further includes a third sub-display panel. The second sub-display panel is filled between the first sub-display panel and the third sub-display panel.

A size and a number of the third sub-display panels are respectively same as the size and the number of the first sub-display panels in the first direction.

In this embodiment, the splicing display including the third sub-display panel is more in line with to an actual splicing display.

In a possible embodiment, the third sub-display panel is aligned with the first sub-display panel. The third sub-display panel and the second sub-display panel are spliced in the first direction with a misaligned manner. The third sub-display panel and the second sub-display panel are misaligned by N rows/columns of sub-pixels.

In this embodiment, on a basis that the splicing display includes the third sub-display panel, the third sub-display panel is misaligned with one of the sub-display panels and is aligned with another one of the sub-display panels.

In a second aspect, the present application further provides a driving method of the splicing display. The spicing display panel includes any one of the splicing displays described above. The method includes:
  obtaining an initial video image to be displayed;
  segmenting the initial video image into a first segmented image and a second segmented image respectively matching the first sub-display panel and the second sub-display panel;
  displaying normally black images in the first normally black display region and the second normally black display region, and respectively displaying the first segmented image and the second segmented image in the first dynamic display region and the second dynamic display region.

In a possible embodiment, three sub-pixels constitute one pixel, and the driving method further includes:
  when N=3a, configuring the first normally black display region to include the first normally black sub-display region, and configuring the second normally black display region to include the third normally black sub-display region. a is a positive integer.

In a possible embodiment, the driving method further includes:
  when 1≠3a, configuring the first normally black display region to include the first normally black sub-display region and the second normally black sub-display region, and configuring the second normally black display region to include the third normally black sub-display region and a fourth normally black sub-display region; wherein the second normally black sub-display region and the first normally black sub-display region are respectively connected to two sides of the first dynamic display region, the fourth normally black sub-display region is connected between the second dynamic display region and the third normally black sub-display region, and numbers of rows/columns of the sub-pixels of the fourth normally black sub-display region and the second normally black sub-display region are same.

In a possible embodiment, the driving method further includes:
  when N=3a−2, configuring the second normally black sub-display region to include two rows/columns of the sub-pixels; and
  when N=3a−1, configuring the second normally black sub-display region to include one row/column of the sub-pixels.

In a possible embodiment, four sub-pixels constitute one pixel, and the driving method further includes:
  when N=4a, configuring the first normally black display region to include the first normally black sub-display region, and configuring the second normally black display region to include the third normally black sub-display region, and a is a positive integer.

In a possible embodiment, the driving method further includes:
  when N≠4a, configuring the first normally black display region to include the first normally black sub-display region and the second normally black sub-display region, and configuring the second normally black display region to include the third normally black sub-display region and a fourth normally black sub-display region; wherein the second normally black sub-display region and the first normally black sub-display region are respectively connected to two sides of the first dynamic display region, the fourth normally black sub-display region is connected between the second dynamic display region and the third normally black sub-display region, and numbers of rows/columns of the sub-pixels of the fourth normally black sub-display region and the second normally black sub-display region are same.

In a possible embodiment, the driving method further includes:
  when N=4a−3, configuring the second normally black sub-display region to include three rows/columns of the sub-pixels;
  when N=4a−2, configuring the second normally black sub-display region to include two rows/columns of the sub-pixels; and
  when N=4a−1, configuring the second normally black sub-display region to include one row/column of the sub-pixels.

The present application further provides a splicing display device. The spicing display device includes any one of the splicing displays described above. The splicing display includes at least two sub-display panels. The at least two sub-display panels include at least one first sub-display panel and at least one second sub-display panel. A size and a number of the first sub-display panels are respectively same as a size and a number of the second sub-display panels in a first direction. The first sub-display panel and the second sub-display panel are spliced in the first direction with a misaligned manner. The first sub-display panel and the second sub-display panel are misaligned by N rows/columns of sub-pixels.

The first sub-display panel includes a first dynamic display region and a first normally black display region. The second sub-display panel includes a second dynamic display region and a second normally black display region. The sub-pixels in the first dynamic display region and the second dynamic display region one-to-one correspond to each other and their number of rows/columns are same. The first normally black display region includes a first normally black sub-display region without correspondence. The second normally black display region includes a third normally black sub-display region without correspondence.

The first normally black sub-display region includes N rows/columns of the sub-pixels. The third normally black sub-display region includes N rows/columns of the sub-pixels. N is a positive integer.

In a possible embodiment, the first normally black display region further includes a second normally black sub-display region. The second normally black sub-display region and the first normally black sub-display region are respectively connected to two sides of the first dynamic display region.

The second normally black display region further includes a fourth normally black sub-display region. The fourth normally black sub-display region is connected between the second dynamic display region and the third normally black sub-display region. Numbers of rows of the sub-pixels of the fourth normally black sub-display region and the second normally black sub-display region are same, or numbers of columns of the sub-pixels of the fourth normally black sub-display region and the second normally black sub-display region are same.

In a possible embodiment, a number of rows or a number of columns of the sub-pixels of the first normally black sub-display region is same as a number of rows or a number of columns of the sub-pixels of the third normally black sub-display region.

The present application provides the splicing display and the driving method. The splicing display includes at least two sub-display panels. The at least two sub-display panels include at least one first sub-display panel and at least one second sub-display panel. The size and the number of the first sub-display panels are respectively same as the size and the number of the second sub-display panels in horizontal or vertical directions. The first sub-display panel and the second sub-display panel are misaligned by N rows/columns of the sub-pixels in the horizontal or vertical directions. In this arrangement of the splicing display, misaligning N rows/columns of the sub-pixels can effectively increase an accuracy of the splicing display, and the first sub-display panel and the second sub-display panel can be prevented from problems of misalignment and blurring.

DESCRIPTION OF DRAWINGS

In order to describe technical solutions in the present application clearly, drawings to be used in the description of embodiments will be described briefly below. Obviously, drawings described below are only for some embodiments of the present application, and other drawings can be obtained by those skilled in the art based on these drawings without creative efforts.

DETAILED DESCRIPTION OF EMBODIMENTS

Figure 1:
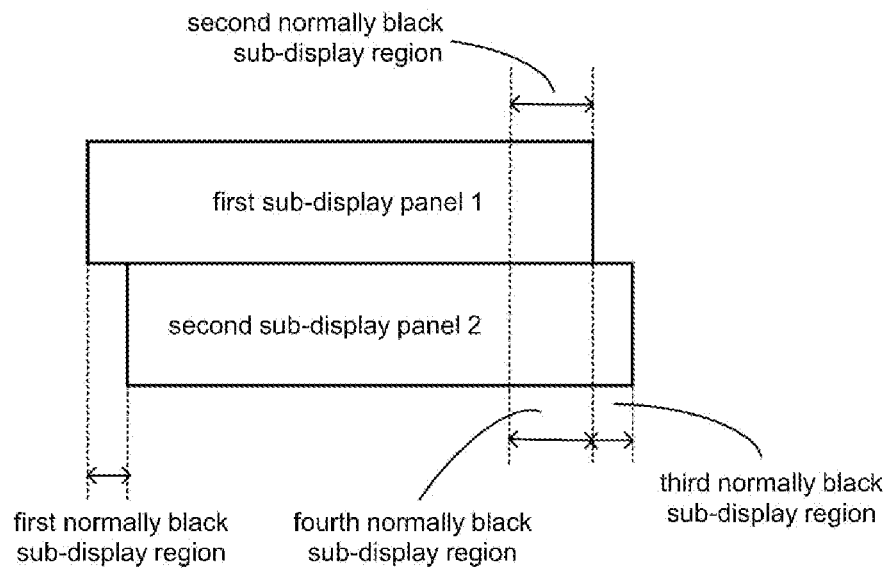
FIG. 1 is a schematic diagram of an embodiment of a splicing display provided by the present application.

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

In the description of the present application, it should be explained that the terms "center", "portrait", "transverse", "length", "width", "thickness", "upper", "lower", "front", the directions or positional relationships indicated by "back", "left", "right", "vertical", "horizontal", "top", "bottom", "inside", "outside", etc. are based on the drawings. The orientation or positional relationship is only for the convenience of describing the present application and simplifying the description, and does not indicate or imply that the device or element referred to must have a specific orientation, structure and operation in a specific orientation, and should not be viewed as limitations of the present application. In addition, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "multiple" is two or more, unless specifically defined otherwise.

The word "exemplary" is used herein to mean "serving as an example, instance, or illustration." Any embodiment or design described herein as "exemplary" is not necessarily to be construed as preferred or advantageous over other embodiments or designs. The following descriptions are presented to enable any person skilled in the art to make and use the present application. Descriptions of specific embodiments and inventions are provided only as examples. Various modifications and combinations of the examples described herein will be readily apparent to those skilled in the art, and the general principles defined herein may be applied to other examples and inventions without departing from the spirit and scope of the present application. Thus, the present application is not intended to be limited to the examples described and shown, but is to be accorded the widest scope consistent with the principles and features disclosed herein.

It should be explained that since methods in embodiments of the present application is executed in an electronic device, processing objects of each electronic device exist in a form of data or information, such as time, which is essentially time information. It can be understood that sizes, quantities, positions, etc. in subsequent embodiments all exist as corresponding data for processing by the electronic device. The details are not repeated here.

Embodiments of the present application provide a splicing display, a driving method, and a splicing display device, which will be described in detail below.

Please refer to FIG. 1, which is a schematic diagram of an embodiment of a splicing display provided by the present application. In the embodiment shown in FIG. 1, the splicing display includes at least two sub-display panels. The at least two sub-display panels include at least one first sub-display panel and at least one second sub-display panel. Both the first sub-display panel and the second sub-display panel include sub-pixels arranged in a multi-row and multi-column array. The first sub-display panel and the second sub-display panel are spliced in the first direction with a misaligned manner. The first sub-display panel and the second sub-display panel are misaligned by N rows the sub-pixels, or the first sub-display panel and the second sub-display panel are misaligned by N columns of the sub-pixels.

Meanwhile, since the first sub-display panel and the second sub-display panel are misaligned by N rows of the sub-pixels or are misaligned by N columns of the sub-pixels, the first sub-display panel includes a first dynamic display region and a first normally black display region, and the second sub-display panel includes a second dynamic display region and a second normally black display region. The sub-pixels in the first dynamic display region and the second dynamic display region one-to-one correspond to each other and their number of rows or columns are same. The first normally black display region includes a first normally black sub-display region without correspondence. The second normally black display region includes a third normally black sub-display region without correspondence.

The first normally black sub-display region includes N rows of the sub-pixels, or the first normally black sub-display region includes N columns of the sub-pixels. Similarly, the third normally black sub-display region includes N rows of the sub-pixels, or the third normally black sub-display region includes N columns of the sub-pixels. Arrangements of the first sub-display panel and the second sub-display panel are different, and misaligned sub-pixels of the two are also different.

The splicing display provided by the present application includes at least two sub-display panels. The at least two sub-display panels include at least one first sub-display panel and at least one second sub-display panel. The size and the number of the first sub-display panels are respectively same as the size and the number of the second sub-display panels in horizontal or vertical directions. The first sub-display panel and the second sub-display panel are misaligned by N rows of the sub-pixels or are misaligned by N columns in the horizontal or vertical directions. In this arrangement of the splicing display, misaligning N rows/columns of the sub-pixels can effectively increase an accuracy of the splicing display, and splicing positions of the first sub-display panel and the second sub-display panel can be prevented from problems of misalignment and blurring.

In the embodiment shown in FIG. 1, the first sub-display panel 1 and the second sub-display panel 2 are top-down disposed along a vertical direction of the splicing display. Specifically, the first sub-display panel 1 is arranged above the second sub-display panel 2. A size and a number of the first sub-display panels are respectively same as a size and a number of the second sub-display panels in a horizontal direction. The first sub-display panel 1 and the second sub-display panel 2 are horizontally misaligned by N columns of the sub-pixels.

Meanwhile, the first sub-display panel 1 includes the first dynamic display region and the first normally black display region, and the second sub-display panel 2 correspondingly includes the second dynamic display region and the second normally black display region. The first dynamic display region includes the sub-pixels arranged in the multi-row and multi-column array, and the second dynamic display region also includes the sub-pixels arranged in the multi-row and multi-column array. The multi-column sub-pixels in the first dynamic display region are same as the multi-column sub-pixels in the second dynamic display region and are arranged in a one-to-one correspondence.

The sub-pixels arranged in the multi-row and multi-column array can be red sub-pixels, green sub-pixels, and blue sub-pixels, which are RGB sub-pixels. Usually, the sub-pixels of each row (or each column) in the sub-display are same, and the sub-pixels of each column (or each row) are interleaved in an order of RGB. In another embodiment of the present application, the sub-pixels arranged in the multi-row and multi-column array can be red sub-pixels, green sub-pixels, blue sub-pixels, and white sub-pixels, which are RGBW sub-pixels. Similarly, the sub-pixels in each row (or each column) of the sub-display are same, and the sub-pixels in each column (or each row) are interleaved in an order of RGBW.

In the embodiment shown in FIG. 1, the first normally black display region further includes a second normally black sub-display region. The second normally black sub-display region and the first normally black sub-display region are respectively connected to two sides of the first dynamic display region. Specifically, due to the misalignment between the first sub-display panel and the second sub-display panel, there are no sub-pixels in the second sub-display panel corresponding to the first normally black sub-display region, which means that the first normally black display region includes the first normally black sub-display region without correspondence. The first normally black sub-display region without correspondence causes the first normally black sub-display region to fail to display images normally.

Since one complete pixel of a sub-display panel normally includes three sub-pixels or four sub-pixels, the number of rows/columns of the sub-pixels of the first dynamic display region and the second dynamic display region that can normally display images are multiples of three or four. Therefore, adjacent three or four sub-pixels can constitute a pixel to normally display images.

When the first normally black sub-display region cannot normally display images, the sub-pixels in the second normally black sub-display region cannot constitute a complete pixel. As a result, the sub-pixels in the second normally black sub-display region cannot normally display images, which makes the second normally black sub-display region become a normally black display region that cannot display images.

Due to the misalignment between the first sub-display panel and the second sub-display panel, there are the first normally black sub-display region formed in the first normally black display region and the second normally black sub-display region formed in the second normally black display region. The first normally black display region includes the first normally black sub-display region without correspondence, and similarly, the second normally black display region includes the third normally black sub-display region without correspondence Please refer to FIG. 1. In FIG. 1, the sub-pixels in a rightmost portion of the second sub-display panel have no corresponding pixels in the first sub-display panel, so that the sub-pixels cannot display images. As a result, these sub-pixels constitute the third normally black sub-display region. The third normally black sub-display region and the first normally black sub-display region are same, and they normally black display regions without correspondence. In other words, there are no sub-pixels corresponding to the first normally black sub-display region and the third normally black sub-display region.

It should be explained that the first normally black display region and the second normally black display region in the embodiments of the present application are both formed by misalignment between different sub-display panels, and the sub-display panels themself do not include normally black display regions that cannot display images.

Figure 2:
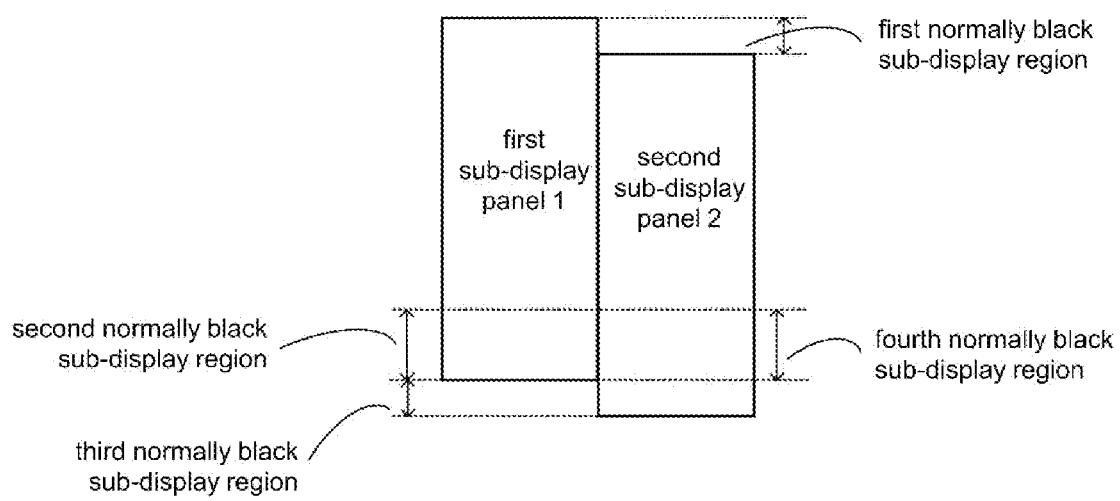
FIG. 2 is another schematic diagram of an embodiment of the splicing display provided by the present application.

Please refer to FIG. 2, which is another schematic diagram of an embodiment of the splicing display provided by the present application. In the embodiment shown in FIG. 2, the splicing display also includes the first sub-display panel and the second sub-display panel. Different from the embodiment shown in FIG. 1, the first sub-display panel 1 and the second sub-display panel 2 shown in FIG. 2 are arranged along the horizontal direction. Specifically, the second sub-display panel 2 is disposed on a right side of the first sub-display panel 1.

Meanwhile, the size and the number of the first sub-display panels are respectively same as the size and the number of the second sub-display panels in the vertical direction. In FIG. 2, the first sub-display panel and the second sub-display panel are misaligned by N rows of the sub-pixels in the vertical direction.

In the embodiment shown in FIG. 2, the first sub-display panel 1 also includes the first dynamic display region that can display images and the first normally black display region that cannot display images. Similarly, the second sub-display panel 2 also includes the second dynamic display region that can display images and the second normally black display region that cannot display images.

Meanwhile, in the embodiment shown in FIG. 2, the first normally black display region also includes the first normally black sub-display region and the second normally black sub-display region, and the second normally black display region includes the third normally black sub-display region and the fourth normally black sub-display region. The first normally black sub-display region and the second normally black sub-display region are respectively disposed on two sides of the first dynamic display region. The second dynamic display region and the third normally black sub-display region are respectively disposed on two sides of the fourth normally black sub-display region.

In the embodiments shown in FIGS. 1 and 2, there are no sub-pixels in second sub-display panel 2 corresponding to the first normally black sub-display region, and there are no sub-pixels in first sub-display panel 1 corresponding to the third normally black sub-display region. Both the first normally black sub-display region and the third normally black sub-display region include N rows of the sub-pixels, or N columns of the sub-pixels.

In an embodiment of the present application, three sub-pixels constitute one pixel, when N equals $3a-2$, which means that the first normally black display region includes $3a-2$ rows (or columns) of the sub-pixels, the second normally black sub-display region can include two rows (or columns) of the sub-pixels.

When the first normally black sub-display region includes $3a-2$ rows of the sub-pixels, the second normally black sub-display region includes one row of the sub-pixels. When the first normally black sub-display region includes $3a-1$ rows of the sub-pixels, the second normally black sub-display region includes two rows of the sub-pixels. When the first normally black sub-display region includes $3a$ rows of the sub-pixels, the second normally black sub-display region includes zero rows of the sub-pixels.

Please refer to FIG. 1. In the embodiment shown in FIG. 1, when one pixel includes three sub-pixels, a can be equal to one, and the first sub-display panel 1 and the second sub-display panel 2 are misaligned by one column of the sub-pixels in the horizontal direction. At this time, the first normally black sub-display region includes one column of the sub-pixels, and the third normally black sub-display region also includes one column of the sub-pixels. Therefore, the second normally black sub-display region includes $3-1=2$ columns of the sub-pixels.

In another embodiment, the first sub-display panel 1 and the second sub-display panel 2 can be misaligned by two columns of the sub-pixels in the horizontal direction. At this time, the first normally black sub-display region includes two columns of the sub-pixels, and the third normally black sub-display region also includes two columns of the sub-pixels. Therefore, the second normally black sub-display region includes $3-2=1$ column of the sub-pixels.

The first sub-display panel 1 and the second sub-display panel 2 can be misaligned by three columns of the sub-pixels in the horizontal direction. At this time, the first normally black sub-display region includes three columns of the sub-pixels, and the third normally black sub-display region also includes three columns of the sub-pixels. Therefore, the second normally black sub-display region includes $3-3=0$ columns of the sub-pixels.

When a is equal to two, the first normally black sub-display region includes four columns of the sub-pixels, and the second normally black sub-display region still includes two columns of the sub-pixels. Similarly, when a is equal to two, the first normally black sub-display region includes five columns of the sub-pixels, and the second normally black sub-display region includes one column of the sub-pixels. When a is equal to three, the first normally black sub-display region includes six columns of the sub-pixels, and the second normally black sub-display region includes zero columns of the sub-pixels.

In another embodiment of the present application, one pixel includes four sub-pixels. When the first normally black sub-display region includes $4a-3$ rows of the sub-pixels, the second normally black sub-display region includes three rows of the sub-pixels. When the first normally black sub-display region includes $4a-2$ rows of the sub-pixels, the second normally black sub-display region includes two rows of the sub-pixels. When the first normally black sub-display region includes $4a-1$ rows of the sub-pixels, the second normally black sub-display region includes one row of the sub-pixels. When the first normally black sub-display region includes $4a$ rows of the sub-pixels, the second normally black sub-display region includes zero rows of the sub-pixels.

When a is equal to one, the first normally black sub-display region includes one row of the sub-pixels, and the second normally black sub-display region includes three rows of the sub-pixels. When a is equal to three, the first normally black sub-display region includes five rows of the sub-pixels, the second normally black sub-display region still includes three rows of the sub-pixels.

Therefore, in an embodiment of the present application, when one pixel includes three sub-pixels, no matter how many rows (or columns) of the sub-pixels are misaligned between the first sub-display panel and the second sub-display panel, the second normally black sub-display region includes only one row of the sub-pixels, two rows of the sub-pixels, or zero rows of the sub-pixels, which means that there is no second normally black sub-display region.

Similarly, when one pixel includes four sub-pixels, no matter how many rows (or columns) of the sub-pixels are misaligned between the first sub-display panel and the second sub-display panel, the second normally black sub-display region includes only one row of the sub-pixels, two rows of the sub-pixels, three rows of the sub-pixels, or zero rows of the sub-pixels. When the second normally black sub-display region includes zero rows of the sub-pixels, there is no second normally black sub-display region.

In an embodiment of the present application, the number of rows or columns of the sub-pixels of the first normally black sub-display region is usually same as the number of rows or columns of the sub-pixels of the third normally black sub-display region.

In the embodiments shown in FIGS. 1 and 2, the first normally black display region includes not only the first normally black sub-display region, but also the second normally black sub-display region. The second normally black display region also includes the third normally black sub-display region and the fourth normally black sub-display region. The second normally black sub-display region usually corresponds to the fourth normally black sub-display region.

When the number of rows or columns of the sub-pixels of the first normally black sub-display region is same as the number of rows or columns of the sub-pixels of the third normally black sub-display region, the number of rows or columns of the sub-pixels of the second normally black sub-display region is also usually same as the number of rows or columns of the sub-pixels of the sub-pixels of the fourth normally black sub-display region.

Figure 3:
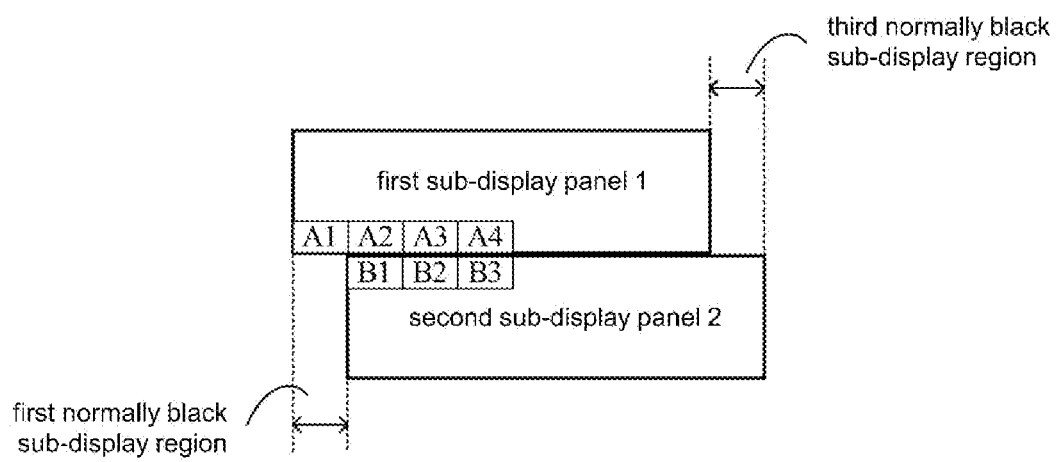
FIG. 3 is another schematic diagram of an embodiment of the splicing display provided by the present application.

Please refer to FIG. 3, which is another schematic diagram of an embodiment of the splicing display provided by the present application. In FIG. 3, the splicing display includes the first sub-display panel 1 and the second sub-display panel 2. Both the first sub-display panel 1 and the second sub-display panel 2 are composed of the sub-pixels. The sub-pixels can be red sub-pixels, green sub-pixels, and blue sub-pixels, which are RGB sub-pixels. Under normal circumstances, the sub-pixels in a same column in the first sub-display panel and the second sub-display panel are of same sub-pixels, such as R sub-pixels, and the sub-pixels in a same row are arranged in an order of RGB.

In the embodiment shown in FIG. 3, the first sub-display panel 1 and the second sub-display panel 2 are misaligned by one sub-pixels. The sub-pixels in a portion under the first sub-display panel 1 connected to the second sub-display panel 2 (i.e., bold region in FIG. 3) are respectively sub-pixels A1-An. The sub-pixels in a portion of the second sub-display panel 2 connected to the first sub-display panel 1 are respectively sub-pixels B1-Bn.

When the first sub-display panel 1 and the second sub-display panel 2 are misaligned by one sub-pixel in the horizontal direction, due to the misalignment of A1, a pixel composed of the sub-pixels A1, A2, and A3 in the first sub-display panel 1 becomes a new pixel composed of the sub-pixels A2, A3, and A4 in the first sub-display panel 1. At this time, an arrangement of the sub-pixels in a pixel changes from RGB to GBR. However, in the second sub-display panel 2, a pixel composed of the sub-pixels B1, B2, and B3, which means that the pixel still arranged in the order of RGB.

In the above-mentioned embodiment, the sub-pixels in the portion of the first sub-display panel 1 connected to the second sub-display panel 2, a first sub-pixel and last two sub-pixels are in zero grayscales, which cannot display images. Same principle applies to other rows of the sub-pixels in the first sub-display panel, the first sub-pixel and the last two sub-pixels cannot display images. In FIG. 3, on left and right sides of each row of the first sub-display panel 1, three columns corresponding to the first sub-pixel and the last two sub-pixels cannot display images. Because the last two pixels of each row in the first sub-display panel 1 cannot constitute a completed pixel, the images cannot be displayed.

The first sub-pixels in every row of the first sub-display panel 1 constitute a column of sub-pixels. This column of the sub-pixels cannot display the images, and this column of the sub-pixels becomes the first normally black sub-display region. Similarly, the last two sub-pixels in every row of the first sub-display panel constitute two columns of the sub-pixels. These two columns of the sub-pixels cannot display the images, and the two columns of the sub-pixels become the second normally black sub-display region.

For the second sub-display panel 2, the sub-pixels An-1 and An correspond to the sub-pixels Bn-2 and Bn-1 in the second sub-display panel. Since the sub-pixels An-1 and An cannot constitute a complete pixel, the sub-pixels An-1 and An cannot display images, which causes the sub-pixels Bn-2, Bn-1, and Bn in the second sub-display panel 2 to fail to display images. Therefore, the sub-pixels Bn-2, Bn-1, and Bn are in zero grayscales and cannot display brightness.

The last sub-pixels in every row of the second sub-display panel 2 constitute a column of the sub-pixels. This column of the sub-pixels cannot display images, which becomes the third normally black sub-display region. The second-to-last sub-pixels and the third-to-last sub-pixels in every row of the second sub-display panel constitute two columns of the sub-pixels. These two columns of the sub-pixels cannot display images, which become the fourth normally black sub-display region.

In the embodiment shown in FIG. 3, the first sub-display panel 1 and the second sub-display panel 2 are arranged in the vertical direction. For splicing displays of other structures in which the first sub-display panel 1 and the second sub-display panel 2 are arranged in the horizontal direction, the dynamic display regions and the normally black display regions described in the above embodiments are applicable.

Figure 4:
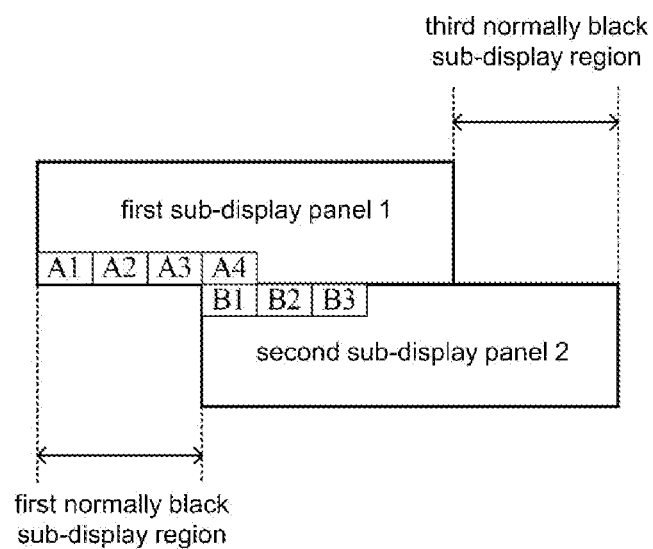
FIG. 4 is another schematic diagram of an embodiment of the splicing display provided by the present application.

Please refer to FIG. 4, which is another schematic diagram of an embodiment of the splicing display provided by the present application. in the embodiment shown in FIG. 4, one pixel includes three sub-pixels. The first sub-display panel 1 and the second sub-display panel 2 are misaligned by three sub-pixels, which means that the first sub-display panel 1 and the second sub-display panel 2 are misaligned by one pixel.

At this time, the first sub-display panel 1 includes only the first normally black sub-display region, not the second normally black sub-display region. Except that the first sub-display panel 1 includes the sub-pixels in the first normally black sub-display region, other sub-pixels can constitute a complete pixel and can normally display images. Similarly, the second sub-display panel 2 includes only the third normally black sub-display region, but not the fourth normally black sub-display region.

In an embodiment of the present application, regardless of whether the second normally black sub-display region and the fourth normally black sub-display region are included, the numbers of rows or columns of the sub-pixels of the first dynamic display region and the second dynamic display region that can normally display images are multiples of three or four. When the second normally black sub-display region and the fourth normally black sub-display region are included, a sum of the numbers of rows of the sub-pixels or a sum of the numbers of columns of the sub-pixels of the fourth normally black sub-display region and the third and fourth normally black display regions is a multiple of three or four.

Whether the number of rows or columns of the sub-pixels is a multiple of three or four depends on whether one pixel includes three or four sub-pixels.

In an embodiment of the present application, the first sub-display panel 1 and the second sub-display panel 2 are misaligned by N rows of the sub-pixels or are misaligned by N columns of the sub-pixels. Therefore, the first normally black sub-display region includes N rows or N columns of the sub-pixels, and the third normally black sub-display region also includes N rows or N columns of the sub-pixels.

If the second normally black sub-display region includes A rows or A columns of the sub-pixels, the entire second normally black display region includes B rows or B columns of the sub-pixels, and A, B, and N satisfy B=A+N.

The sum of the number of rows of the sub-pixels of the second normally black display region that cannot display images is equal to the sum of the number of rows of the sub-pixels of the first normally black sub-display region plus the sum of the number of rows of the sub-pixels of the second normally black sub-display region. In another embodiment, the sum of the number of columns of the sub-pixels of the second normally black display region that cannot display images is equal to the sum of the number of columns of the sub-pixels of the first normally black sub-display region plus the sum of the number of columns of the sub-pixels of the second normally black sub-display region.

If the second normally black sub-display region is not included, the second normally black sub-display region includes zero rows or aero columns of the sub-pixels, and A is equal to zero. Therefore, the second normally black display region does not include the fourth sub-display region, and the number of rows or columns of the sub-pixels of the second normally black display region is equal to the number of rows or columns of the sub-pixels of the first normally black sub-display region.

The present application further provides a splicing display including a third sub-display panel. The third sub-display panel is filled between the first sub-display panel 1 and the second sub-display panel 2. A size and a number of the third sub-display panels are respectively same as the size and the number of the first sub-display panels 1 (or the second sub-display panels 2) in the first direction.

In the above-described embodiment including the third sub-display panel, when the first sub-display panel 1 and the second sub-display panel 2 are misaligned, the third sub-display panel generally remains fixed to one of the sub-display panels. Although the first sub-display panel 1 and the second sub-display panel 2 are misaligned, the third sub-display panel is misaligned with one of the sub-display panels, and the third sub-display panel remains fixed with the other one of the sub-display panels.

Specifically, the third sub-display panel can be aligned with the first sub-display panel 1, and the third sub-display panel and the second sub-display panel 2 can be spliced in the first direction with a misaligned manner. The third sub-display panel and the second sub-display panel 2 are misaligned by N rows of the sub-pixels, or the third sub-display panel and the second sub-display panel are misaligned by N columns of the sub-pixels.

In an embodiment of the present application, the splicing display also includes a dynamic display region and a normally black display region, but the dynamic display region and the normally black display region here include the third sub-display panel. For details, please refer to the foregoing descriptions about the dynamic display regions and the normally black display regions, which will not be repeated herein.

In an embodiment of the present application, the first sub-display panel and the second sub-display panel can be same or different. When the first sub-display panel and the second sub-display panel are different, one of the sub-display panels can be regarded as the third sub-display panel in the foregoing embodiment, and the third sub-display panel and one of the sub-display panels can be regarded as a whole.

Meanwhile, in other embodiments, the splicing display can include more sub-display panels, and the misalignment described in the embodiments of the present application can be implemented among the sub-display panels. For details, please refer to the foregoing content, which will not be repeated herein.

It should be explained that in an embodiment of the present application, although misaligning different sub-display panels by N sub-pixels generates normally black display regions that cannot display images, there are only one, two, or three sub-pixels wide of the misalignment regions because the normally black display regions are moved to edges portions of the splicing display. Therefore, areas of the normally black display regions are very small and usually cannot be recognized by the human eye. Compared with prior art, this still effectively increases an image accuracy of splicing positions of the sub-display panels and the third sub-display panel, and problems of misalignment and blurring can be prevented.

The present application further provides a splicing display device. The spicing display panel includes any one of the splicing displays described above. Please refer to FIG. 1, which is a schematic diagram of an embodiment of a splicing display provided by the present application. In the embodiment shown in FIG. 1, the splicing display includes at least two sub-display panels. The at least two sub-display panels include at least one first sub-display panel and at least one second sub-display panel. Both the first sub-display panel and the second sub-display panel include sub-pixels arranged in a multi-row and multi-column array. The first sub-display panel and the second sub-display panel are spliced in the first direction with a misaligned manner. The first sub-display panel and the second sub-display panel are misaligned by N rows the sub-pixels, or the first sub-display panel and the second sub-display panel are misaligned by N columns of the sub-pixels.

Meanwhile, since the first sub-display panel and the second sub-display panel are misaligned by N rows of the sub-pixels or are misaligned by N columns of the sub-pixels, the first sub-display panel includes a first dynamic display region and a first normally black display region, and the second sub-display panel includes a second dynamic display region and a second normally black display region. The sub-pixels in the first dynamic display region and the second dynamic display region one-to-one correspond to each other and their number of rows or columns are same. The first normally black display region includes a first normally black sub-display region without correspondence. The second normally black display region includes a third normally black sub-display region without correspondence.

The first normally black sub-display region includes N rows of the sub-pixels, or the first normally black display region includes N columns of the sub-pixels. Similarly, the third normally black sub-display region includes N rows of the sub-pixels, or the third normally black sub-display region includes N columns of the sub-pixels. Arrangements of the first sub-display panel and the second sub-display panel are different, and misaligned sub-pixels of the two are also different.

The splicing display provided by the present application includes at least two sub-display panels. The at least two sub-display panels include at least one first sub-display panel and at least one second sub-display panel. The size and the number of the first sub-display panels are respectively same as the size and the number of the second sub-display panels in horizontal or vertical directions. The first sub-display panel and the second sub-display panel are misaligned by N rows of the sub-pixels or are misaligned by N columns in the horizontal or vertical directions. In this arrangement of the splicing display, misaligning N rows/columns of the sub-pixels can effectively increase an accuracy of the splicing display, and splicing positions of the first sub-display panel and the second sub-display panel can be prevented from problems of misalignment and blurring.

In the embodiment shown in FIG. 1, the first sub-display panel 1 and the second sub-display panel 2 are top-down disposed along a vertical direction of the splicing display. Specifically, the first sub-display panel 1 is arranged above the second sub-display panel 2. A size and a number of the first sub-display panels are respectively same as a size and a number of the second sub-display panels in a horizontal direction. The first sub-display panel 1 and the second sub-display panel 2 are horizontally misaligned by N columns of the sub-pixels.

Meanwhile, the first sub-display panel 1 includes the first dynamic display region and the first normally black display region, and the second sub-display panel 2 correspondingly includes the second dynamic display region and the second normally black display region. The first dynamic display region includes the sub-pixels arranged in the multi-row and multi-column array, and the second dynamic display region also includes the sub-pixels arranged in the multi-row and multi-column array. The multi-column sub-pixels in the first dynamic display region are same as the multi-column sub-pixels in the second dynamic display region and are arranged in a one-to-one correspondence.

The sub-pixels arranged in the multi-row and multi-column array can be red sub-pixels, green sub-pixels, and blue sub-pixels, which are RGB sub-pixels. Usually, the sub-pixels of each row (or each column) in the sub-display are same, and the sub-pixels of each column (or each row) are interleaved in an order of RGB. In another embodiment of the present application, the sub-pixels arranged in the multi-row and multi-column array can be red sub-pixels, green sub-pixels, blue sub-pixels, and white sub-pixels, which are RGBW sub-pixels. Similarly, the sub-pixels in each row (or each column) of the sub-display are same, and the sub-pixels in each column (or each row) are interleaved in an order of RGBW.

In the embodiment shown in FIG. 1, the first normally black display region further includes a second normally black sub-display region. The second normally black sub-display region and the first normally black sub-display region are respectively connected to two sides of the first dynamic display region. Specifically, due to the misalignment between the first sub-display panel and the second sub-display panel, there are no sub-pixels in the second sub-display panel corresponding to the first normally black sub-display region, which means that the first normally black display region includes the first normally black sub-display region without correspondence. The first normally black sub-display region without correspondence causes the first normally black sub-display region to fail to display images normally.

Since one complete pixel of a sub-display panel normally includes three sub-pixels or four sub-pixels, the number of rows/columns of the sub-pixels of the first dynamic display region and the second dynamic display region that can normally display images are multiples of three or four. Therefore, adjacent three or four sub-pixels can constitute a pixel to normally display images.

When the first normally black sub-display region cannot normally display images, the sub-pixels in the second normally black sub-display region cannot constitute a complete pixel. As a result, the sub-pixels in the second normally black sub-display region cannot normally display images, which makes the second normally black sub-display region become a normally black display region that cannot display images.

Due to the misalignment between the first sub-display panel and the second sub-display panel, there are the first normally black sub-display region formed in the first normally black display region and the second normally black sub-display region formed in the second normally black display region. The first normally black display region includes the first normally black sub-display region without correspondence, and similarly, the second normally black display region includes the third normally black sub-display region without correspondence Please refer to FIG. 1. In FIG. 1, the sub-pixels in a rightmost portion of the second sub-display panel have no corresponding pixels in the first sub-display panel, so that the sub-pixels cannot display images. As a result, these sub-pixels constitute the third normally black sub-display region. The third normally black sub-display region and the first normally black sub-display region are same, and they normally black display regions without correspondence. In other words, there are no sub-pixels corresponding to the first normally black sub-display region and the third normally black sub-display region.

It should be explained that the first normally black display region and the second normally black display region in the embodiments of the present application are both formed by misalignment between different sub-display panels, and the sub-display panels themself do not include normally black display regions that cannot display images.

Please refer to FIG. 2, which is another schematic diagram of an embodiment of the splicing display provided by the present application. In the embodiment shown in FIG. 2, the splicing display also includes the first sub-display panel and the second sub-display panel. Different from the embodiment shown in FIG. 1, the first sub-display panel 1 and the second sub-display panel 2 shown in FIG. 2 are arranged along the horizontal direction. Specifically, the second sub-display panel 2 is disposed on a right side of the first sub-display panel 1.

Meanwhile, the size and the number of the first sub-display panels are respectively same as the size and the number of the second sub-display panels in the vertical direction. In FIG. 2, the first sub-display panel and the second sub-display panel are misaligned by N rows of the sub-pixels in the vertical direction.

In the embodiment shown in FIG. 2, the first sub-display panel 1 also includes the first dynamic display region that can display images and the first normally black display region that cannot display images. Similarly, the second sub-display panel 2 also includes the second dynamic display region that can display images and the second normally black display region that cannot display images.

Meanwhile, in the embodiment shown in FIG. 2, the first normally black display region also includes the first normally black sub-display region and the second normally black sub-display region, and the second normally black display region includes the third normally black sub-display region and the fourth normally black sub-display region. The first normally black sub-display region and the second normally black sub-display region are respectively disposed on two sides of the first dynamic display region. The second dynamic display region and the third normally black sub-display region are respectively disposed on two sides of the fourth normally black sub-display region.

In the embodiments shown in FIGS. 1 and 2, there are no sub-pixels in second sub-display panel 2 corresponding to the first normally black sub-display region, and there are no sub-pixels in first sub-display panel 1 corresponding to the third normally black sub-display region. Both the first normally black sub-display region and the third normally black sub-display region include N rows of the sub-pixels, or N columns of the sub-pixels.

In an embodiment of the present application, three sub-pixels constitute one pixel, when N equals 3a−2, which means that the first normally black display region includes 3a−2 rows (or columns) of the sub-pixels, the second normally black sub-display region can include two rows (or columns) of the sub-pixels.

When the first normally black sub-display region includes 3a−2 rows of the sub-pixels, the second normally black sub-display region includes one row of the sub-pixels. When the first normally black sub-display region includes 3a−1 rows of the sub-pixels, the second normally black sub-display region includes two rows of the sub-pixels. When the first normally black sub-display region includes 3a rows of the sub-pixels, the second normally black sub-display region includes zero rows of the sub-pixels.

Please refer to FIG. 1. In the embodiment shown in FIG. 1, when one pixel includes three sub-pixels, a can be equal to one, and the first sub-display panel 1 and the second sub-display panel 2 are misaligned by one column of the sub-pixels in the horizontal direction. At this time, the first normally black sub-display region includes one column of the sub-pixels, and the third normally black sub-display region also includes one column of the sub-pixels. Therefore, the second normally black sub-display region includes 3−1=2 columns of the sub-pixels.

In another embodiment, the first sub-display panel 1 and the second sub-display panel 2 can be misaligned by two columns of the sub-pixels in the horizontal direction. At this time, the first normally black sub-display region includes two columns of the sub-pixels, and the third normally black sub-display region also includes two columns of the sub-pixels. Therefore, the second normally black sub-display region includes 3−2=1 column of the sub-pixels.

The first sub-display panel 1 and the second sub-display panel 2 can be misaligned by three columns of the sub-pixels in the horizontal direction. At this time, the first normally black sub-display region includes three columns of the sub-pixels, and the third normally black sub-display region also includes three columns of the sub-pixels. Therefore, the second normally black sub-display region includes 3−3=0 columns of the sub-pixels.

When a is equal to two, the first normally black sub-display region includes four columns of the sub-pixels, and the second normally black sub-display region still includes two columns of the sub-pixels. Similarly, when a is equal to two, the first normally black sub-display region includes five columns of the sub-pixels, and the second normally black sub-display region includes one column of the sub-pixels. When a is equal to three, the first normally black sub-display region includes six columns of the sub-pixels, and the second normally black sub-display region includes zero columns of the sub-pixels.

In another embodiment of the present application, one pixel includes four sub-pixels. When the first normally black sub-display region includes 4a−3 rows of the sub-pixels, the second normally black sub-display region includes three rows of the sub-pixels. When the first normally black sub-display region includes 4a−2 rows of the sub-pixels, the second normally black sub-display region includes two rows of the sub-pixels. When the first normally black sub-display region includes 4a−1 rows of the sub-pixels, the second normally black sub-display region includes one row of the sub-pixels. When the first normally black sub-display region includes 4a rows of the sub-pixels, the second normally black sub-display region includes zero rows of the sub-pixels.

When a is equal to one, the first normally black sub-display region includes one row of the sub-pixels, and the second normally black sub-display region includes three rows of the sub-pixels. When a is equal to three, the first normally black sub-display region includes five rows of the sub-pixels, the second normally black sub-display region still includes three rows of the sub-pixels.

Therefore, in an embodiment of the present application, when one pixel includes three sub-pixels, no matter how many rows (or columns) of the sub-pixels are misaligned between the first sub-display panel and the second sub-display panel, the second normally black sub-display region includes only one row of the sub-pixels, two rows of the sub-pixels, or zero rows of the sub-pixels, which means that there is no second normally black sub-display region.

Similarly, when one pixel includes four sub-pixels, no matter how many rows (or columns) of the sub-pixels are misaligned between the first sub-display panel and the second sub-display panel, the second normally black sub-display region includes only one row of the sub-pixels, two rows of the sub-pixels, three rows of the sub-pixels, or zero rows of the sub-pixels. When the second normally black sub-display region includes zero rows of the sub-pixels, there is no second normally black sub-display region.

In an embodiment of the present application, the number of rows or columns of the sub-pixels of the first normally black sub-display region is usually same as the number of rows or columns of the sub-pixels of the third normally black sub-display region.

In the embodiments shown in FIGS. 1 and 2, the first normally black display region includes not only the first normally black sub-display region, but also the second normally black sub-display region. The second normally black display region also includes the third normally black sub-display region and the fourth normally black sub-display region. The second normally black sub-display region usually corresponds to the fourth normally black sub-display region.

When the number of rows or columns of the sub-pixels of the first normally black sub-display region is same as the number of rows or columns of the sub-pixels of the third normally black sub-display region, the number of rows or columns of the sub-pixels of the second normally black sub-display region is also usually same as the number of rows or columns of the sub-pixels of the sub-pixels of the fourth normally black sub-display region.

Please refer to FIG. 3, which is another schematic diagram of an embodiment of the splicing display provided by the present application. In FIG. 3, the splicing display includes the first sub-display panel 1 and the second sub-display panel 2. Both the first sub-display panel 1 and the second sub-display panel 2 are composed of the sub-pixels. The sub-pixels can be red sub-pixels, green sub-pixels, and blue sub-pixels, which are RGB sub-pixels. Under normal circumstances, the sub-pixels in a same column in the first sub-display panel and the second sub-display panel are of same sub-pixels, such as R sub-pixels, and the sub-pixels in a same row are arranged in an order of RGB.

In the embodiment shown in FIG. 3, the first sub-display panel 1 and the second sub-display panel 2 are misaligned by one sub-pixels. The sub-pixels in a portion under the first sub-display panel 1 connected to the second sub-display panel 2 (i.e., bold region in FIG. 3) are respectively sub-pixels A1-An. The sub-pixels in a portion of the second sub-display panel 2 connected to the first sub-display panel 1 are respectively sub-pixels B1-Bn.

When the first sub-display panel 1 and the second sub-display panel 2 are misaligned by one sub-pixel in the horizontal direction, due to the misalignment of A1, a pixel composed of the sub-pixels A1, A2, and A3 in the first sub-display panel 1 becomes a new pixel composed of the sub-pixels A2, A3, and A4 in the first sub-display panel 1. At this time, an arrangement of the sub-pixels in a pixel changes from RGB to GBR. However, in the second sub-display panel 2, a pixel composed of the sub-pixels B1, B2, and B3, which means that the pixel still arranged in the order of RGB.

In the above-mentioned embodiment, the sub-pixels in the portion of the first sub-display panel 1 connected to the second sub-display panel 2, a first sub-pixel and last two sub-pixels are in zero grayscales, which cannot display images. Same principle applies to other rows of the sub-pixels in the first sub-display panel, the first sub-pixel and the last two sub-pixels cannot display images. In FIG. 3, on left and right sides of each row of the first sub-display panel 1, three columns corresponding to the first sub-pixel and the last two sub-pixels cannot display images. Because the last two pixels of each row in the first sub-display panel 1 cannot constitute a completed pixel, the images cannot be displayed.

The first sub-pixels in every row of the first sub-display panel 1 constitute a column of sub-pixels. This column of the sub-pixels cannot display the images, and this column of the sub-pixels becomes the first normally black sub-display region. Similarly, the last two sub-pixels in every row of the first sub-display panel constitute two columns of the sub-pixels. These two columns of the sub-pixels cannot display the images, and the two columns of the sub-pixels become the second normally black sub-display region.

For the second sub-display panel 2, the sub-pixels An-1 and An correspond to the sub-pixels Bn-2 and Bn-1 in the second sub-display panel. Since the sub-pixels An-1 and An cannot constitute a complete pixel, the sub-pixels An-1 and An cannot display images, which causes the sub-pixels Bn-2, Bn-1, and Bn in the second sub-display panel 2 to fail to display images. Therefore, the sub-pixels Bn-2, Bn-1, and Bn are in zero grayscales and cannot display brightness.

The last sub-pixels in every row of the second sub-display panel 2 constitute a column of the sub-pixels. This column of the sub-pixels cannot display images, which becomes the third normally black sub-display region. The second-to-last sub-pixels and the third-to-last sub-pixels in every row of the second sub-display panel constitute two columns of the sub-pixels. These two columns of the sub-pixels cannot display images, which become the fourth normally black sub-display region.

In the embodiment shown in FIG. 3, the first sub-display panel 1 and the second sub-display panel 2 are arranged in the vertical direction. For splicing displays of other structures in which the first sub-display panel 1 and the second sub-display panel 2 are arranged in the horizontal direction, the dynamic display regions and the normally black display regions described in the above embodiments are applicable.

Please refer to FIG. 4, which is another schematic diagram of an embodiment of the splicing display provided by the present application. in the embodiment shown in FIG. 4, one pixel includes three sub-pixels. The first sub-display panel 1 and the second sub-display panel 2 are misaligned by three sub-pixels, which means that the first sub-display panel 1 and the second sub-display panel 2 are misaligned by one pixel.

At this time, the first sub-display panel 1 includes only the first normally black sub-display region, not the second normally black sub-display region. Except that the first sub-display panel 1 includes the sub-pixels in the first normally black sub-display region, other sub-pixels can constitute a complete pixel and can normally display images. Similarly, the second sub-display panel 2 includes only the third normally black sub-display region, but not the fourth normally black sub-display region.

In an embodiment of the present application, regardless of whether the second normally black sub-display region and the fourth normally black sub-display region are included, the numbers of rows or columns of the sub-pixels of the first dynamic display region and the second dynamic display region that can normally display images are multiples of three or four. When the second normally black sub-display region and the fourth normally black sub-display region are included, a sum of the numbers of rows of the sub-pixels or a sum of the numbers of columns of the sub-pixels of the fourth normally black sub-display region and the third and fourth normally black display regions is a multiple of three or four.

Whether the number of rows or columns of the sub-pixels is a multiple of three or four depends on whether one pixel includes three or four sub-pixels.

In an embodiment of the present application, the first sub-display panel 1 and the second sub-display panel 2 are misaligned by N rows of the sub-pixels or are misaligned by N columns of the sub-pixels. Therefore, the first normally black sub-display region includes N rows or N columns of the sub-pixels, and the third normally black sub-display region also includes N rows or N columns of the sub-pixels.

If the second normally black sub-display region includes A rows or A columns of the sub-pixels, the entire second normally black display region includes B rows or B columns of the sub-pixels, and A, B, and N satisfy B=A+N.

The sum of the number of rows of the sub-pixels of the second normally black display region that cannot display images is equal to the sum of the number of rows of the sub-pixels of the first normally black sub-display region plus the sum of the number of rows of the sub-pixels of the second normally black sub-display region. In another embodiment, the sum of the number of columns of the sub-pixels of the second normally black display region that cannot display images is equal to the sum of the number of columns of the sub-pixels of the first normally black sub-display region plus the sum of the number of columns of the sub-pixels of the second normally black sub-display region.

If the second normally black sub-display region is not included, the second normally black sub-display region includes zero rows or aero columns of the sub-pixels, and A is equal to zero. Therefore, the second normally black display region does not include the fourth sub-display region, and the number of rows or columns of the sub-pixels of the second normally black display region is equal to the number of rows or columns of the sub-pixels of the first normally black sub-display region.

The present application further provides a splicing display including a third sub-display panel. The third sub-display panel is filled between the first sub-display panel 1 and the second sub-display panel 2. A size and a number of the third sub-display panels are respectively same as the size and the number of the first sub-display panels 1 (or the second sub-display panels 2) in the first direction.

In the above-described embodiment including the third sub-display panel, when the first sub-display panel 1 and the second sub-display panel 2 are misaligned, the third sub-display panel generally remains fixed to one of the sub-display panels. Although the first sub-display panel 1 and the second sub-display panel 2 are misaligned, the third sub-display panel is misaligned with one of the sub-display panels, and the third sub-display panel remains fixed with the other one of the sub-display panels.

In an embodiment of the present application, the splicing display also includes a dynamic display region and a normally black display region, but the dynamic display region and the normally black display region here include the third sub-display panel. For details, please refer to the foregoing descriptions about the dynamic display regions and the normally black display regions, which will not be repeated herein.

Figure 5:
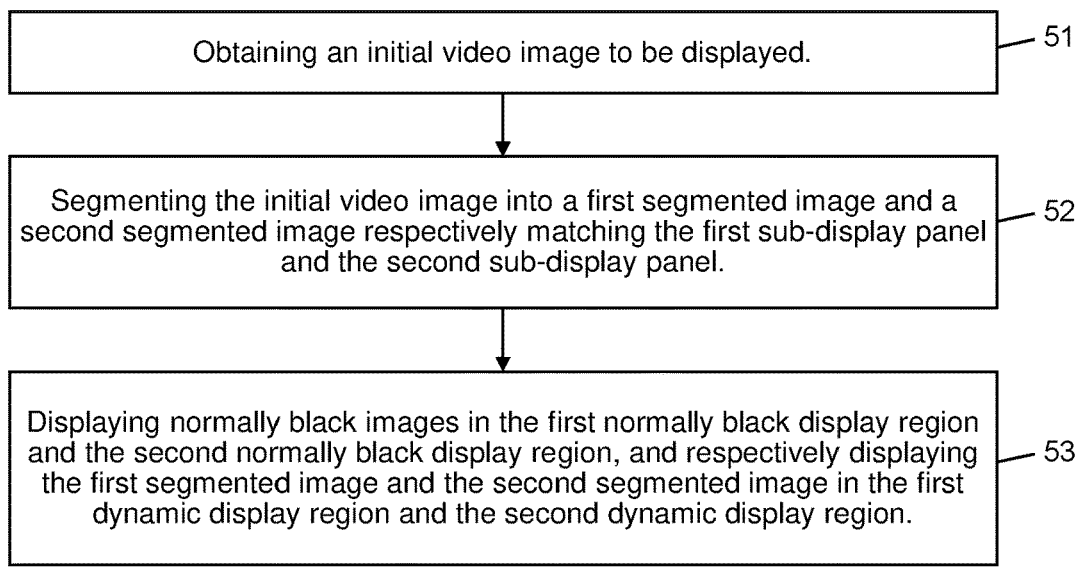
FIG. 5 is a flowchart of a driving method of an embodiment of the splicing display provided by the present application.

The present application further provides a driving method of a splicing display. The spicing display panel includes any one of the splicing displays described above. Please refer to FIG. 5, which is a flowchart of the driving method of an embodiment of the splicing display provided by the present application. The method can include the following steps.

51, obtaining an initial video image to be displayed.

52, segmenting the initial video image into a first segmented image and a second segmented image respectively matching the first sub-display panel and the second sub-display panel.

53, displaying normally black images in the first normally black display region and the second normally black display region, and respectively displaying the first segmented image and the second segmented image in the first dynamic display region and the second dynamic display region.

Since the first sub-display panel and the second sub-display panel display different images, it is necessary to segment the initial video image to obtain the first segmented image matching the first sub-display panel and the second segmented image matching the second sub-display panel.

Since the first sub-display panel and the second sub-display panel of the embodiment of the present application are misaligned by N rows of the sub-pixels in the first direction or are misaligned by N columns of the sub-pixels, each segmented image needs to be moved so that the moved images can be aligned.

Specifically, the first segmented image can be moved along the first direction by N rows or N columns of the sub-pixels to obtain a third segmented image, while the second segmented image does not move. The third segmented image is configured to drive the first sub-display panel, and the second segmented image is configured to drive the third sub-display panel, so that images displayed by the first sub-display panel and images displayed by the second sub-display panel are aligned without misalignment.

In an embodiment of the present application, the first sub-display panel of splicing display can include the first dynamic display region, and the second sub-display panel can includes the second dynamic display region since the splicing display includes the splicing display described in any of the above embodiments. The sub-pixels in the first dynamic display region and the second dynamic display region one-to-one correspond to each other and their number of rows/columns are same.

The first sub-display panel is driven by the third segmented image, and the second sub-display panel is driven by the second segmented image. Therefore, images displayed by the first sub-display panel are aligned with images displayed by the second sub-display panel. The method further includes the following step.

Driving the first sub-display panel by the third segmented image and driving the second sub-display panel by the second segmented image to align the images displayed by the first sub-display panel and the images displayed by the second sub-display panel.

Since the first sub-display panel and the second sub-display panel are misaligned in the splicing display, corresponding images of the first sub-display panel and the second sub-display panel will also be misaligned compared to their original images, but this will align the misaligned images, thereby solving the misalignment problem of original images.

In an embodiment of the present application, three sub-pixels constitute one pixel. The driving method further includes when N=3a, configuring the first normally black display region to include the first normally black sub-display region, and configuring the second normally black display region to include the third normally black sub-display region, and a is a positive integer.

In another embodiment, The driving method further includes when N≠3a, configuring the first normally black display region to include the first normally black sub-display region and the second normally black sub-display region, and configuring the second normally black display region to include the third normally black sub-display region and a fourth normally black sub-display region. The second normally black sub-display region and the first normally black sub-display region are respectively connected to two sides of the first dynamic display region. The fourth normally black sub-display region is connected between the second dynamic display region and the third normally black sub-display region. Numbers of rows/columns of the sub-pixels of the fourth normally black sub-display region and the second normally black sub-display region are same.

The driving method further includes: when N=3a−2, configuring the second normally black sub-display region to include two rows/columns of the sub-pixels; and when N=3a−1, configuring the second normally black sub-display region to include one row/column of the sub-pixels.

In another embodiment, four sub-pixels constitute one pixel. The driving method further includes when N=4a, configuring the first normally black display region to include the first normally black sub-display region, and configuring the second normally black display region to include the third normally black sub-display region, and a is a positive integer.

The driving method further includes when N≠4a, configuring the first normally black display region to include the first normally black sub-display region and the second normally black sub-display region, and configuring the second normally black display region to include the third normally black sub-display region and a fourth normally black sub-display region. The second normally black sub-display region and the first normally black sub-display region are respectively connected to two sides of the first dynamic display region. The fourth normally black sub-display region is connected between the second dynamic display region and the third normally black sub-display region. Numbers of rows/columns of the sub-pixels of the fourth normally black sub-display region and the second normally black sub-display region are same.

In another embodiment, the driving method further includes: when N=4a−3, configuring the second normally black sub-display region to include three rows/columns of the sub-pixels; when N=4a−2, configuring the second normally black sub-display region to include two rows/columns of the sub-pixels; and when N=4a−1, configuring the second normally black sub-display region to include one row/column of the sub-pixels.

Figure 6:
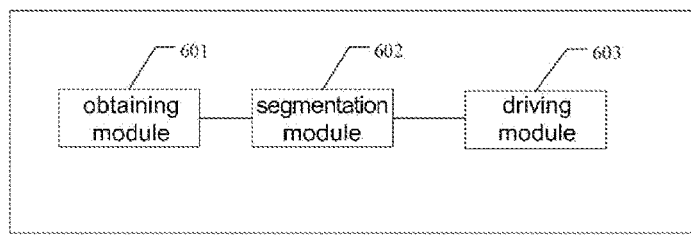
FIG. 6 is a schematic diagram of an embodiment of a splicing display device provided by the present application.

In order to better implement the driving method of the splicing display in an embodiment of the present application, on a basis of the driving method of the splicing display, the embodiment of the present application further provides a splicing display device. As shown in FIG. 6, the splicing display device 600 includes:

an obtaining module 601 configured to obtain the initial video image to be displayed;

a segmentation module 602 configured to segment the initial video image into the first segmented image and the second segmented image matching the first sub-display panel and the second sub-display panel;

a driving module 603 configured to display normally black images in the first normally black display region and the second normally black display region and configured to respectively display the first segmented image and the second segmented image in the first dynamic display region and the second dynamic display region.

An embodiment of the present application further provides a computer device integrating any of an express mailing label identification device provided by the embodiment of the present application. The computer device includes:

one or more processors;
a memory;
one or more programs wherein the one or more application programs are stored in the memory and is configured to be executed by the processor to perform steps in an express mailing label identification method in any of the above-mentioned embodiments of the express mailing label identification method.

Figure 7:
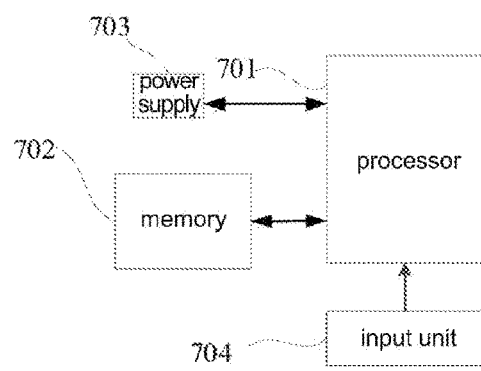
FIG. 7 is a schematic diagram of a computer device involved in an embodiment of the present application.

Please refer to FIG. 7, which is a schematic diagram of the computer device involved in an embodiment of the present application.

The computer device can include the processor 701 of one or more processing cores, the memory 702 of one or more computer-readable storage media, a power supply 703, an input unit 704, and other components. Those skilled in the art can understand that a structure of the computer device shown in FIG. 5 does not constitute a limitation on the computer device. The computer device can include more or less components than shown, or some combination of components, or a different arrangement of components.

The processor 701 is a control center of the computer device. Various parts of the computer device are connected through various interfaces and lines. By running or executing software programs and/or modules stored in the memory 702 and calling data stored in the memory 702, various functions of the computer device are performed, and data is processed, thereby performing overall monitoring of the computer device. Optionally, the processor 701 can include one or more processing cores. The processor 701 can be a central processing unit (CPU) and can further be other general-purpose processors, a digital signal processor (DSP), an application specific integrated circuit (ASIC), a field-programmable gate array (FPGA), or other programmable logic devices, discrete gate, transistor logic devices, discrete hardware components, etc. The general-purpose processor can be a microprocessor, or the processor can be any conventional processor or the like. Optionally, the processor 701 can integrate an application processor and a modem processor. The application processor mainly deals with operating systems, user interfaces, and application programs, etc., and the modem processor mainly deals with wireless communication. It can be understood that the above-mentioned the modem processor may not be integrated into the processor 701.

The memory 702 can be configured to store software programs and modules. The processor 701 executes various functional applications and data processing by executing software programs and modules stored in the memory 702. The memory 702 can mainly include a stored program region and a stored data region. The stored program region can store an operating system, an application program required for at least one function (such as a sound playback function, an image playback function, etc.), and the like. The storage data region can store data or the like created according to a use of the computer device. In addition, the memory 702 can include a high-speed random access memory, and can further include a non-volatile memory, such as at least one magnetic disk storage device, flash memory device, or other volatile solid state storage devices. Accordingly, the memory 702 can further include a memory controller to provide the processor 701 access to the memory 702.

The computer device further includes a power supply 703 for powering the various components. Preferably, the power supply 703 can be logically connected to the processor 701 through a power management system, so as to implement functions such as managing charging, discharging, and power consumption through the power management system. The power supply 703 can further include one or more direct current or alternating current power supplies, recharging systems, power failure detection circuits, power converters or inverters, power status indicators, and any other components.

The computer device can further include an input unit 704. The input unit 704 can be configured to receive input numerical or character information, and generate keyboard, mouse, joystick, optical or trackball signal input related to user settings and function control.

The computer device can further include a display unit and the like, which will not be described herein again. In this embodiment, the processor 701 in the computer device loads executable files corresponding to processes of one or more application programs into the memory 702, and the processor 701 runs the application programs stored in the memory 702, so as to realize the following functions.

Obtaining an initial video image to be displayed. Segmenting the initial video image into a first segmented image and a second segmented image respectively matching the first sub-display panel and the second sub-display panel. Displaying normally black images in the first normally black display region and the second normally black display region, and respectively displaying the first segmented image and the second segmented image in the first dynamic display region and the second dynamic display region.

Those of ordinary skill in the art can understand that all or part of the steps in the various methods of the above embodiments can be completed by instructions, or by instructions to control related hardware. The instructions can be stored in a computer-readable storage medium and loaded and executed by the processor.

An embodiment of the present application provides the computer-readable storage medium. The computer-readable storage medium can include a read only memory (ROM), a random access memory (RAM), a magnetic disk, or an optical disk, and the like. The computer-readable storage medium stores a computer program. The computer program is loaded by the processor to execute the steps in any one of the express mailing label identification methods provided in the embodiments of the present application. For example, the computer program being loaded by the processor can perform the following steps.

Obtaining an initial video image to be displayed. Segmenting the initial video image into a first segmented image and a second segmented image respectively matching the first sub-display panel and the second sub-display panel. Displaying normally black images in the first normally black display region and the second normally black display region, and respectively displaying the first segmented image and the second segmented image in the first dynamic display region and the second dynamic display region.

In the above embodiments, the descriptions of the various embodiments are different in emphases, for contents not described in detail, please refer to related description of other embodiments.

In specific implementation, each of the above units or structures can be implemented as independent entities, or can be arbitrarily combined to implement as one or several entities. For the specific implementation of the above units or structures, reference may be made to the foregoing method embodiments, and details are not described herein again.

The splicing display, the driving method, and the splicing display device provided by embodiments of the present application are described in detail above, and the description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A splicing display, comprising at least two sub-display panels;
    wherein the at least two sub-display panels comprise at least one first sub-display panel and at least one second sub-display panel, a size and a number of the first sub-display panels are respectively same as a size and a number of the second sub-display panels in a first direction, the first sub-display panel and the second sub-display panel are spliced in the first direction with a misaligned manner, and the first sub-display panel and the second sub-display panel are misaligned by N rows/columns of sub-pixels;
    wherein the first sub-display panel comprises a first dynamic display region and a first normally black display region, the second sub-display panel comprises a second dynamic display region and a second normally black display region, the sub-pixels in the first dynamic display region and the second dynamic display region one-to-one correspond to each other and their number of rows/columns are same;
    wherein the first normally black display region comprises a first normally black sub-display region without correspondence, and the second normally black display region comprises a third normally black sub-display region without correspondence;
    wherein the first normally black sub-display region comprises N rows/columns of the sub-pixels, the third normally black sub-display region comprises N rows/columns of the sub-pixels, and N is a positive integer,
    wherein the first normally black display region further comprises a second normally black sub-display region, and the second normally black sub-display region and the first normally black sub-display region are respectively connected to two sides of the first dynamic display region;
    the second normally black display region further comprises a fourth normally black sub-display region, the fourth normally black sub-display region is connected between the second dynamic display region and the third normally black sub-display region; and
    numbers of rows of the sub-pixels of the fourth normally black sub-display region and the second normally black sub-display region are same, or numbers of columns of the sub-pixels of the fourth normally black sub-display region and the second normally black sub-display region are same.

2. The splicing display according to claim 1, wherein a number of rows or a number of columns of the sub-pixels of the first dynamic display region and the second dynamic display region is a multiple of three or four.

3. The splicing display according to claim 1, wherein a sum of numbers of rows of the sub-pixels or a sum of numbers of columns of the sub-pixels of the fourth normally black sub-display region and the third normally black sub-display region is a multiple of three or four.

4. The splicing display according to claim 1, wherein a number of rows or a number of columns of the sub-pixels of the first normally black sub-display region is same as a number of rows or a number of columns of the sub-pixels of the third normally black sub-display region.

5. The splicing display according to claim 4, wherein three sub-pixels constitute one pixel;
    when N=3a−2, the second normally black sub-display region comprises two rows/columns of the sub-pixels,
    when N=3a−1, the second normally black sub-display region comprises one row/column of the sub-pixels,
    and when N=3a, the second normally black sub-display region comprises zero rows/columns of the sub-pixels, and a is a positive integer.

6. The splicing display according to claim 4, wherein four sub-pixels constitute one pixel;
    when N=4a−3, the second normally black sub-display region comprises three rows/columns of the sub-pixels,
    when N=4a−2, the second normally black sub-display region comprises two rows/columns of the sub-pixels,
    when N=4a−1, the second normally black sub-display region comprises one row/column of the sub-pixels,
    and when N=4a, the second normally black sub-display region comprises zero rows/columns of the sub-pixels, and a is a positive integer.

7. The splicing display according to claim 1, wherein the first sub-display panel and the second sub-display panel are same.

8. The splicing display according to claim 1, wherein the splicing display further comprises a third sub-display panel, the second sub-display panel is filled between the first sub-display panel and the third sub-display panel, and a size and a number of the third sub-display panels are respectively same as the size and the number of the first sub-display panels in the first direction.

9. The splicing display according to claim 8, wherein the third sub-display panel is aligned with the first sub-display panel, the third sub-display panel and the second sub-display panel are spliced in the first direction with the misaligned manner, and the third sub-display panel and the second sub-display panel are misaligned by N rows/columns of sub-pixels.

10. A driving method of a splicing display, wherein the splicing display comprises the splicing display according to claim 1, and the driving method comprises:
    obtaining an initial video image to be displayed;
    segmenting the initial video image into a first segmented image and a second segmented image respectively matching the first sub-display panel and the second sub-display panel;
    displaying normally black images in the first normally black display region and the second normally black display region, and respectively displaying the first segmented image and the second segmented image in the first dynamic display region and the second dynamic display region.

11. The driving method of the splicing display according to claim 10, wherein three sub-pixels constitute one pixel, and the driving method further comprises:
    when N=3a, configuring the first normally black display region to comprise the first normally black sub-display region, and configuring the second normally black display region to comprise the third normally black sub-display region, and a is a positive integer.

12. The driving method of the splicing display according to claim 11, wherein the driving method further comprises:
    when N≠3a, configuring the first normally black display region to comprise the first normally black sub-display region and the second normally black sub-display region, and configuring the second normally black display region to comprise the third normally black sub-display region and a fourth normally black sub-display region;
    wherein the second normally black sub-display region and the first normally black sub-display region are respectively connected to two sides of the first dynamic display region, the fourth normally black sub-display region is connected between the second dynamic display region and the third normally black sub-display region, and numbers of rows/columns of the sub-pixels of the fourth normally black sub-display region and the second normally black sub-display region are same.

13. The driving method of the splicing display according to claim 11, wherein the driving method further comprises:
    when N=3a−2, configuring the second normally black sub-display region to comprise two rows/columns of the sub-pixels; and
    when N=3a−1, configuring the second normally black sub-display region to comprise one row/column of the sub-pixels.

14. The driving method of the splicing display according to claim 10, wherein four sub-pixels constitute one pixel, and the driving method further comprises:
    when N=4a, configuring the first normally black display region to comprise the first normally black sub-display region, and configuring the second normally black display region to comprise the third normally black sub-display region, and a is a positive integer.

15. The driving method of the splicing display according to claim 10, wherein the driving method further comprises:
    when N≠4a, configuring the first normally black display region to comprise the first normally black sub-display region and the second normally black sub-display region, and configuring the second normally black display region to comprise the third normally black sub-display region and a fourth normally black sub-display region;
    wherein the second normally black sub-display region and the first normally black sub-display region are respectively connected to two sides of the first dynamic display region, the fourth normally black sub-display region is connected between the second dynamic display region and the third normally black sub-display region, and numbers of rows/columns of the sub-pixels of the fourth normally black sub-display region and the second normally black sub-display region are same.

16. The driving method of the splicing display according to claim 15, wherein the driving method further comprises:
    when N=4a−3, configuring the second normally black sub-display region to comprise three rows/columns of the sub-pixels;
    when N=4a−2, configuring the second normally black sub-display region to comprise two rows/columns of the sub-pixels; and
    when N=4a−1, configuring the second normally black sub-display region to comprise one row/column of the sub-pixels.

17. A splicing display device, comprising a splicing display, wherein the splicing display comprises at least two sub-display panels;
    wherein the at least two sub-display panels comprise at least one first sub-display panel and at least one second sub-display panel, a size and a number of the first sub-display panels are respectively same as a size and a number of the second sub-display panels in a first direction, the first sub-display panel and the second sub-display panel are spliced in the first direction with a misaligned manner, and the first sub-display panel and the second sub-display panel are misaligned by N rows/columns of sub-pixels;
    wherein the first sub-display panel comprises a first dynamic display region and a first normally black display region, the second sub-display panel comprises a second dynamic display region and a second normally black display region, the sub-pixels in the first dynamic display region and the second dynamic display region one-to-one correspond to each other and their number of rows/columns are same;
    wherein the first normally black display region comprises a first normally black sub-display region without correspondence, and the second normally black display region comprises a third normally black sub-display region without correspondence;
    wherein the first normally black sub-display region comprises N rows/columns of the sub-pixels, the third normally black sub-display region comprises N rows/columns of the sub-pixels, and N is a positive integer, wherein the first normally black display region further comprises a second normally black sub-display region, and the second normally black sub-display region and the first normally black sub-display region are respectively connected to two sides of the first dynamic display region;

the second normally black display region further comprises a fourth normally black sub-display region, the fourth normally black sub-display region is connected between the second dynamic display region and the third normally black sub-display region; and numbers of rows of the sub-pixels of the fourth normally black sub-display region and the second normally black sub-display region are same, or numbers of columns of the sub-pixels of the fourth normally black sub-display region and the second normally black sub-display region are same.

18. The splicing display device according to claim 17, wherein a number of rows or a number of columns of the sub-pixels of the first normally black sub-display region is same as a number of rows or a number of columns of the sub-pixels of the third normally black sub-display region.

\* \* \* \* \*